US012311525B2

(12) United States Patent
Tsai

(10) Patent No.: US 12,311,525 B2
(45) Date of Patent: May 27, 2025

(54) HAND TOOL HOLDER STRUCTURE

(71) Applicant: Chang-Yu Tsai, Taichung (TW)

(72) Inventor: Chang-Yu Tsai, Taichung (TW)

(*) Notice: Subject to any disclaimer, the term of this patent is extended or adjusted under 35 U.S.C. 154(b) by 81 days.

(21) Appl. No.: 18/449,392

(22) Filed: Aug. 14, 2023

(65) Prior Publication Data

US 2025/0058454 A1 Feb. 20, 2025

(51) Int. Cl.
*B25B 13/56* (2006.01)
*B25B 15/00* (2006.01)
*B25B 23/16* (2006.01)
*B25H 3/00* (2006.01)

(52) U.S. Cl.
CPC ........... *B25H 3/003* (2013.01); *B25B 15/008* (2013.01); *B25B 13/56* (2013.01)

(58) Field of Classification Search
CPC ......... B25B 13/56; B25B 15/008; B25F 1/04; B25G 1/08; B25G 1/043; B25H 3/003; B25H 3/04; B25H 3/02; B65D 25/107; B65D 25/108
USPC ...... 206/372, 376, 377; 211/70.6; D8/71, 85
See application file for complete search history.

(56) References Cited

U.S. PATENT DOCUMENTS 1,973,188 A * 9/1934 Verderber ............... B25B 13/56 211/70.6
2,715,028 A * 8/1955 Dossie .................... B25B 13/56 81/436
2,810,472 A * 10/1957 Midkiff ................... B25B 13/56 206/377
3,997,053 A * 12/1976 Bondhus ................. B25B 13/56 D8/71
4,043,230 A * 8/1977 Scrivens ................. B25B 13/56 81/439
4,640,155 A * 2/1987 Condon .................. B25B 23/16 81/439
D343,106 S * 1/1994 Eklind ......................... D6/682.2
5,394,984 A * 3/1995 Aiba ...................... B25B 15/008 206/372
5,816,401 A * 10/1998 Vasudeva ............... B25H 3/003 211/70.6
5,822,830 A * 10/1998 Lin ........................ B25G 1/005 81/177.1
D435,415 S * 12/2000 Johnson ............................ D8/71

(Continued)

FOREIGN PATENT DOCUMENTS

JP 2000218573 A * 8/2000

*Primary Examiner* — Gideon R Weinerth
(74) *Attorney, Agent, or Firm* — Chun-Ming Shih; LANWAY IPR SERVICES

(57) ABSTRACT

A hand tool holder structure includes a first body, a second body, and a third body. The first body is provided with a receiving face, multiple first receiving grooves, a first limit portion, a first pivot portion, a recess, multiple first resting blocks, a snap-fit portion, and a first inclined face. The second body is provided with multiple second receiving grooves, a first receiving chamber, a third pivot portion, a first pivot hole, a second inclined face, a first locking block, a second limit portion, a first locking section, and a second locking section. The third body is provided with multiple third receiving grooves, a second receiving chamber, a fourth pivot portion, a second pivot hole, a third inclined face, a second locking block, a third limit portion, a third locking section, and a fourth locking section.

9 Claims, 14 Drawing Sheets

(56) References Cited

U.S. PATENT DOCUMENTS

| | | | | | |
|---|---|---|---|---|---|
| 6,332,381 | B1 * | 12/2001 | Vasudeva | B25B 15/008 81/177.1 |
| 6,378,701 | B1 * | 4/2002 | Kuo | B25B 15/008 220/4.23 |
| D459,967 | S * | 7/2002 | Johnson | D8/71 |
| 6,510,766 | B1 * | 1/2003 | Lin | B25B 15/008 81/439 |
| 7,946,203 | B2 * | 5/2011 | Johnson | B25G 1/066 81/439 |
| D784,104 | S * | 4/2017 | Lai | D8/71 |
| 9,919,415 | B1 * | 3/2018 | Su | B25H 3/003 |
| 10,207,400 | B2 * | 2/2019 | Gallegos | B25G 3/24 |
| 10,377,030 | B2 * | 8/2019 | Gallegos | B25F 1/02 |
| 10,618,158 | B2 * | 4/2020 | Liu | B25B 23/16 |
| 10,723,014 | B2 * | 7/2020 | Gallegos | B25H 3/003 |
| 2003/0110906 | A1 * | 6/2003 | Li | B25G 1/005 81/177.1 |
| 2003/0136234 | A1 * | 7/2003 | Cunningham | B25B 15/008 81/177.4 |
| 2006/0101955 | A1 * | 5/2006 | Chang | B25B 15/008 81/439 |
| 2007/0186731 | A1 * | 8/2007 | Schnarr | B25H 3/003 81/177.4 |
| 2011/0226713 | A1 * | 9/2011 | Su | B25H 3/003 211/70.6 |
| 2013/0228484 | A1 * | 9/2013 | Yang | B25H 3/003 206/349 |
| 2013/0228539 | A1 * | 9/2013 | Lin | B25H 3/003 211/70.6 |
| 2013/0256168 | A1 * | 10/2013 | Poillot | B25B 15/008 206/372 |
| 2013/0277258 | A1 * | 10/2013 | Lai | B25B 15/008 206/377 |
| 2014/0151253 | A1 * | 6/2014 | Lai | B25H 3/003 206/377 |
| 2015/0001113 | A1 * | 1/2015 | Hsiao | A45F 5/021 206/377 |
| 2015/0151413 | A1 * | 6/2015 | Ou | B25H 3/003 206/377 |
| 2015/0158154 | A1 * | 6/2015 | Chen | B25F 1/00 206/377 |
| 2016/0136791 | A1 * | 5/2016 | Ou | B25H 3/003 206/377 |
| 2016/0167218 | A1 * | 6/2016 | Chou | B25B 13/56 206/377 |
| 2016/0207189 | A1 * | 7/2016 | Chen | B25B 15/008 |
| 2016/0236342 | A1 * | 8/2016 | Evatt | B25H 3/003 |
| 2016/0354916 | A1 * | 12/2016 | Tsai | B25G 1/085 |
| 2018/0281170 | A1 * | 10/2018 | Tsai | B25H 3/003 |
| 2020/0398418 | A1 * | 12/2020 | Tsai | B25G 1/063 |
| 2021/0001459 | A1 * | 1/2021 | Tsai | B25B 23/0042 |
| 2021/0001460 | A1 * | 1/2021 | Tsai | B25G 1/005 |
| 2021/0046635 | A1 * | 2/2021 | Langlotz | B25B 13/06 |
| 2024/0208038 | A1 * | 6/2024 | Liu | B25H 3/003 |
| 2024/0286266 | A1 * | 8/2024 | Ibrahim | B25G 3/22 |
| 2025/0058454 | A1 * | 2/2025 | Tsai | B25H 3/003 |

* cited by examiner

HAND TOOL HOLDER STRUCTURE

BACKGROUND OF THE INVENTION

Field of the Invention

The present invention relates to a hand tool holder structure for holding and storing hand tools, such as hex wrenches.

Description of the Related Art

A conventional combinational tool holder device was disclosed in the U.S. Pat. No. 9,102,041, and comprises a holder base 10, a first combination holder 20, and a second combination holder 30. The first combination holder 20 is provided with a first holder claw 22. The second combination holder 30 is provided with a second holder claw 32.

However, the conventional combinational tool holder device has the following disadvantages.

1. The first holder claw 22 of the first combination holder 20 and the second holder claw 32 of the second combination holder 30 construct a clamping structure to clamp the holder base 10. Thus, the clamping structure is easily detached, thereby causing inconvenience to the user during operation.

2. The holder base 10, the first combination holder 20, and the second combination holder 30 are used to receive few hand tools only, thereby limiting the versatility of the conventional combinational tool holder device.

BRIEF SUMMARY OF THE INVENTION

In accordance with the present invention, there is provided a hand tool holder structure comprising a first body unit including a first body, a second body, and a third body. The first body is provided with a receiving face, multiple first receiving grooves, a first limit portion, a first pivot portion, a recess, multiple first resting blocks, a snap-fit portion, and a first inclined face. The second body is provided with multiple second receiving grooves, a first receiving chamber, a first opening, a second opening, a third pivot portion, a first pivot hole, a second inclined face, a first locking block, a second limit portion, a first locking section, and a second locking section. The third body is provided with multiple third receiving grooves, a second receiving chamber, a third opening, a fourth opening, a fourth pivot portion, a second pivot hole, a third inclined face, a second locking block, a third limit portion, a third locking section, and a fourth locking section.

According to the primary advantages of the present invention, the third pivot portion is pivotally connected with the fourth pivot portion by the second pivot member so that the third body is pivotally connected with the second body. The second limit portion and the third limit portion are locked on the first limit portion. Thus, the second body and the third body are mounted on the first body unit steadily and solidly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
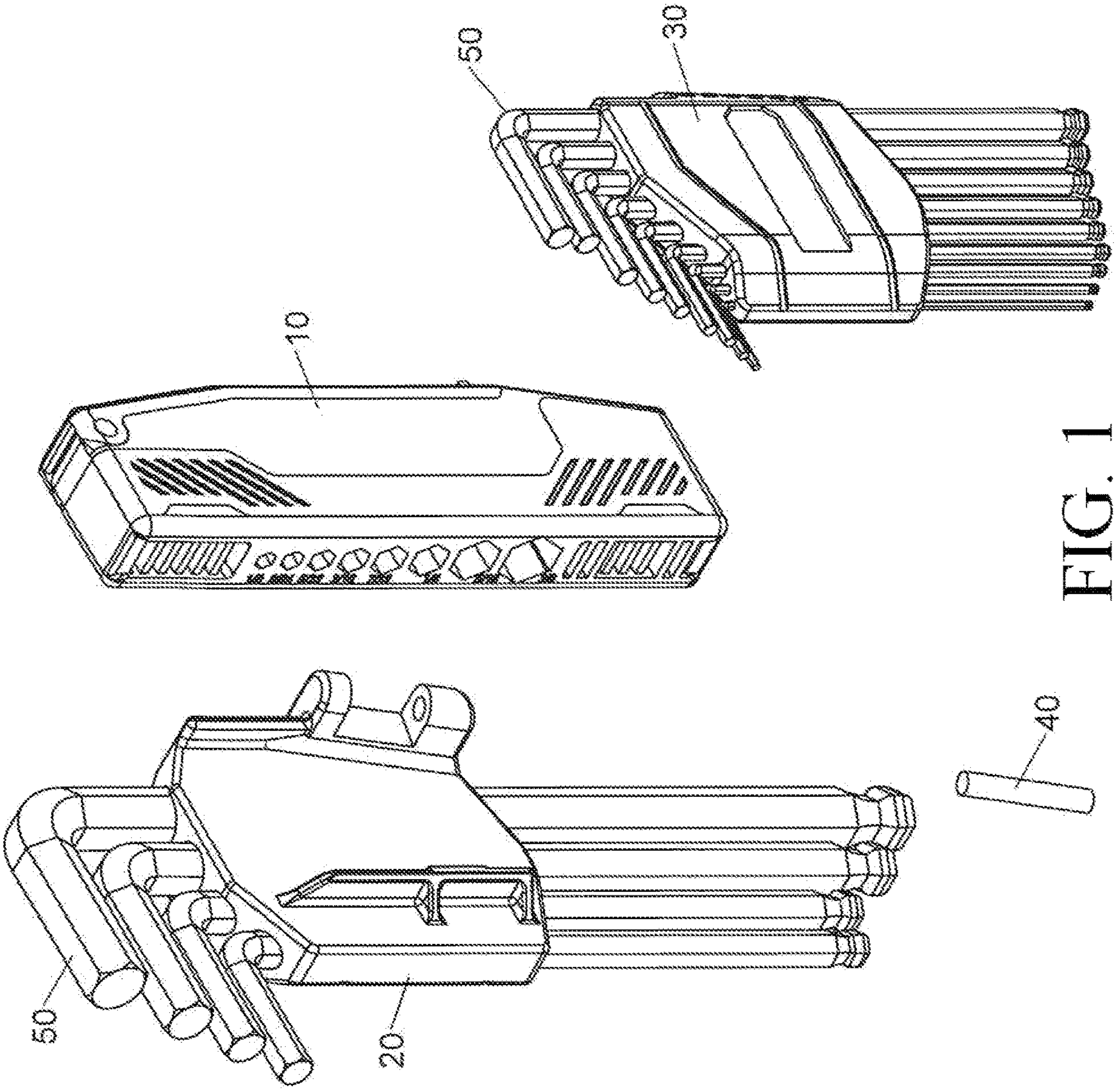
FIG. 1 is an exploded perspective view of a hand tool holder structure in accordance with the preferred embodiment of the present invention.
Figure 2:
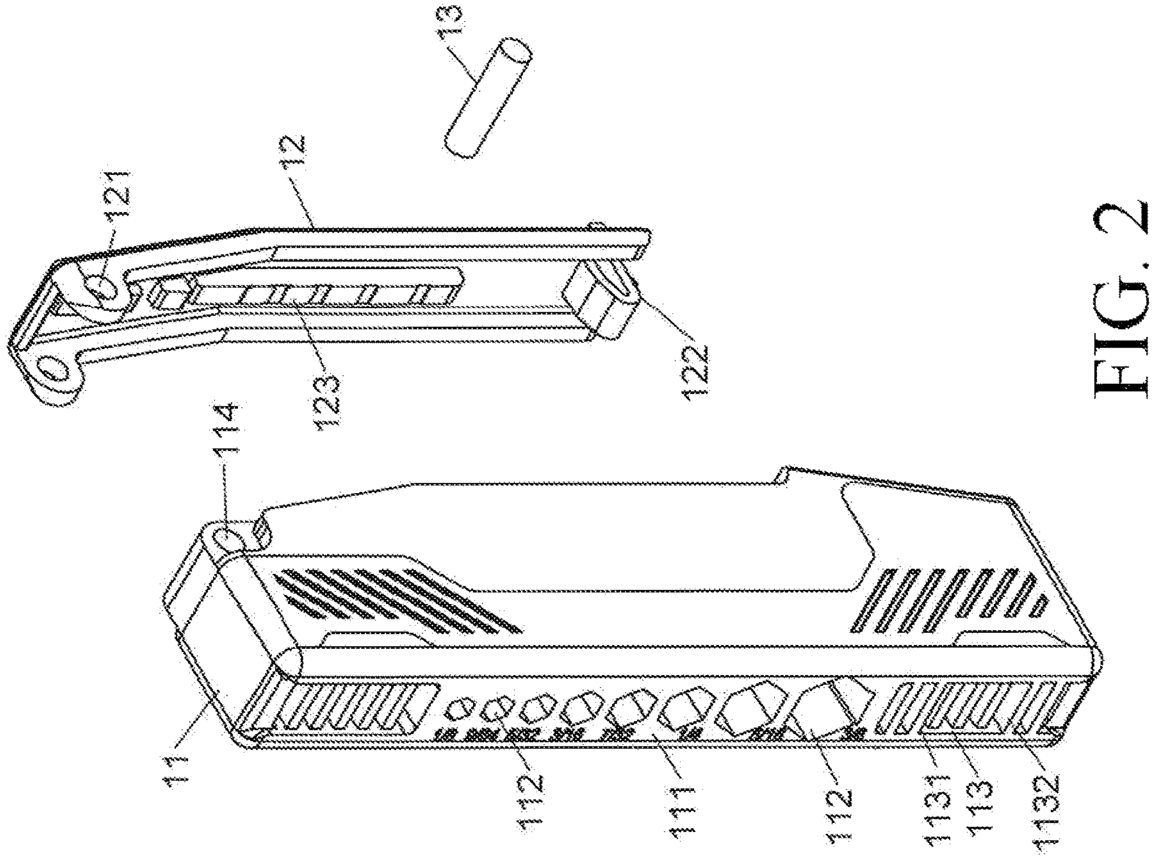
FIG. 2 is an exploded perspective view of a first body unit of the hand tool holder structure in accordance with the preferred embodiment of the present invention.
Figure 3:
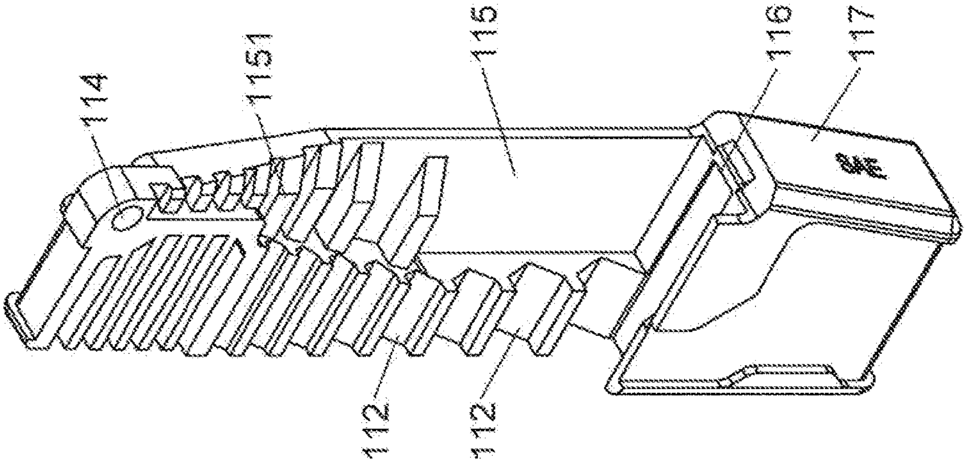
FIG. 3 is a partial perspective view of a first body of the hand tool holder structure in accordance with the preferred embodiment of the present invention.
Figure 5:
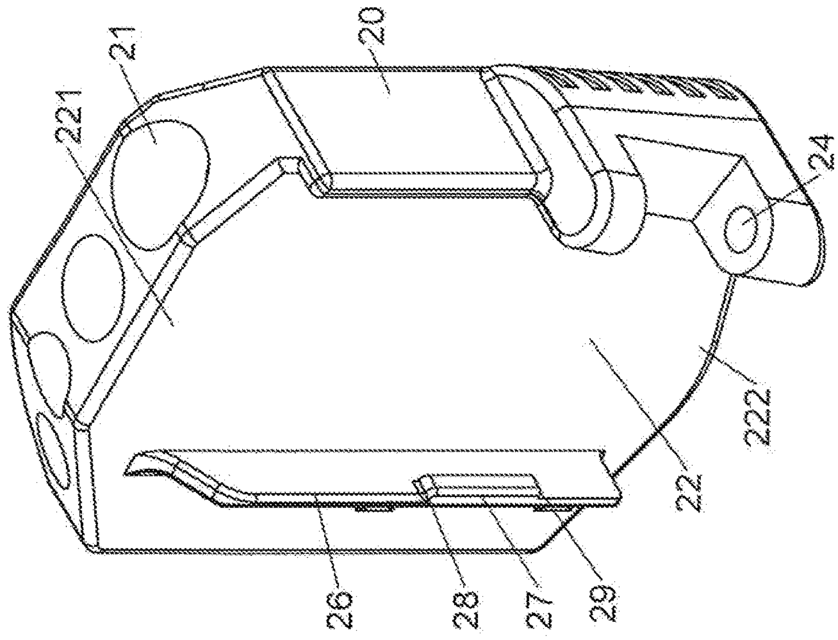
FIG. 5 is a perspective view of a second body of the hand tool holder structure in accordance with the preferred embodiment of the present invention.
Figure 4:
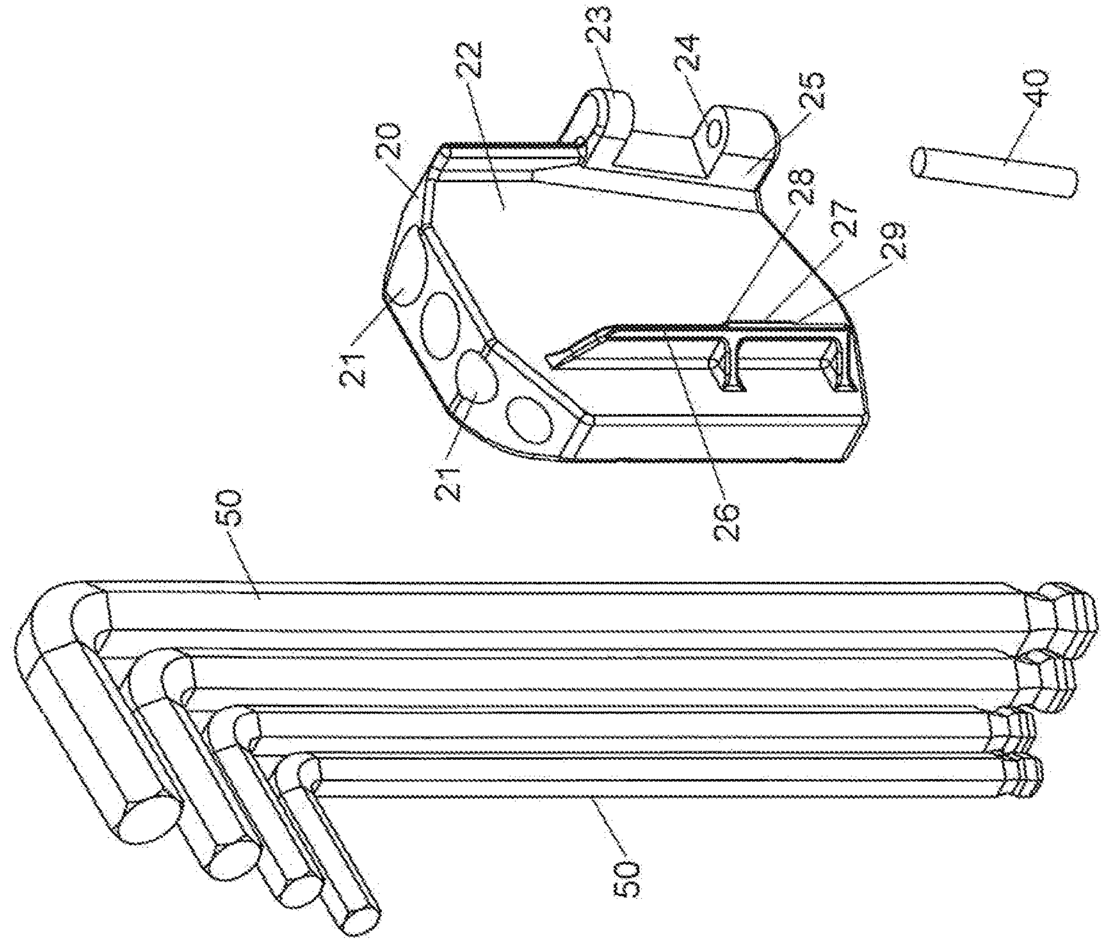
FIG. 4 is a partial exploded perspective view of the hand tool holder structure in accordance with the preferred embodiment of the present invention.
Figure 7:
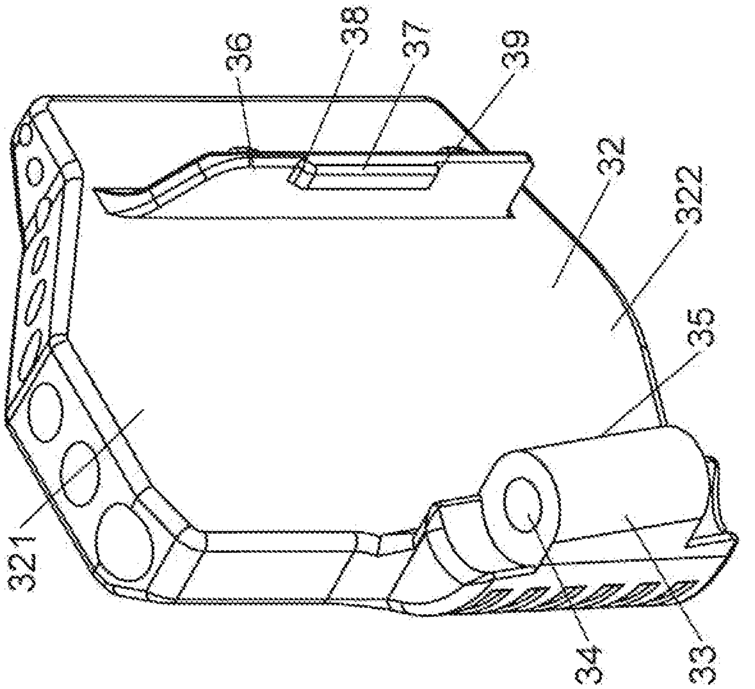
FIG. 7 is a perspective view of a third body of the hand tool holder structure in accordance with the preferred embodiment of the present invention.
Figure 6:
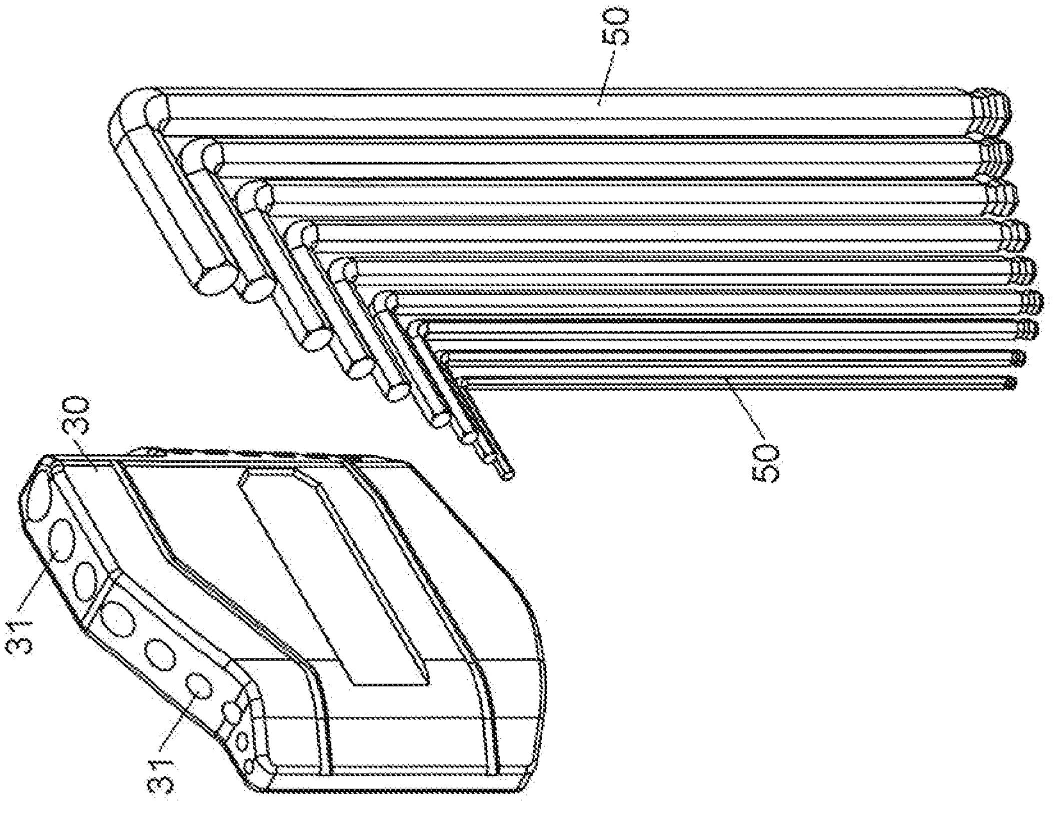
FIG. 6 is a partial exploded perspective view of the hand tool holder structure in accordance with the preferred embodiment of the present invention.

Referring to the drawings and initially to FIGS. 1-11, a hand tool holder structure in accordance with the preferred embodiment of the present invention comprises a first body unit (or holder unit) 10 including a first body 11, a cover 12, and a first pivot member 13.

The first body 11 is an elongate block. The first body 11 has a first side provided with a receiving face 111. The receiving face 111 has a planar shape. The receiving face 111 is provided with multiple first receiving grooves 112. Each of the first receiving grooves 112 has a hexagonal or noncircular shape. The first receiving grooves 112 are arranged linearly. The first receiving grooves 112 have different specifications. The receiving face 111 is provided with multiple or characters (or markings) indicating different sizes of the first receiving grooves 112. The first receiving grooves 112 are arranged at a central position of the receiving face 111. The receiving face 111 is provided with a first limit portion 113. The first limit portion 113 is a depression (or recess or groove). The first limit portion 113 has an upper end provided with a first abutting portion 1131 and a lower end provided with a second abutting portion 1132. The first limit portion 113 situated at a side of the first receiving grooves 112. The first body 11 has an end provided with a first pivot portion 114. The first pivot portion 114 is a transverse circular hole.

The first body 11 has a second side provided with a recess (or cavity) 115. The second side of the first body 11 is opened through the recess 115. The recess 115 is connected to the first receiving grooves 112. The recess 115 has an elongate shape. The recess 115 is provided with multiple first resting blocks 1151. The first resting blocks 1151 are arranged linearly. The first resting blocks 1151 are parallel with the first receiving grooves 112. The recess 115 is provided with a snap-fit (or locking) portion 116. The snap-fit portion 116 and the first pivot portion 114 are located at two opposite ends of the recess 115. The first body 11 has a bottom provided with a first inclined face 117. The bottom of the first body 11 has a width gradually decreased from top to bottom along the first inclined face 117. The first inclined face 117 is close to the snap-fit portion 116. The first inclined face 117 and the first limit portion 113 are located at two opposite sides of the first body 11.

The cover 12 is pivotally connected with the first body 11. The cover 12 covers the recess 115. The cover 12 has a first end provided with a second pivot portion 121 pivotally connected with the first pivot portion 114. The cover 12 is rotated relative to the first body 11 to open or close the recess 115. The cover 12 has a second end provided with a snap-fit (or locking) piece 122 locked (or snapped) on the snap-fit portion 116. The snap-fit piece 122 is elastic. The cover 12 has a side provided with a second resting block 123 aligning with the first resting blocks 1151.

The first pivot member 13 extends through the first pivot portion 114 and the second pivot portion 121 so that the cover 12 is pivotally connected with the first body 11 to open or close the recess 115.

The hand tool holder structure further comprises a second body 20, a third body 30, and a second pivot member 40.

The second body 20 is snap-fitted (or snapped) on the first body unit 10. The second body 20 has a top provided with multiple second receiving grooves 21. The second receiving grooves 21 have different specifications. The second body 20 has a side provided with a first receiving chamber 22. The first receiving chamber 22 receives the first body unit 10 partially. The first receiving chamber 22 has a top provided with a first opening 221 and a bottom provided with a second opening 222. The first opening 221 is larger than the second opening 222. The second body 20 has a first end provided with a third pivot portion 23 and a first pivot hole 24. The second body 20 is provided with a second inclined face 25 abutting the first inclined face 117. The second inclined face 25 is provided on the third pivot portion 23.

Figure 9:
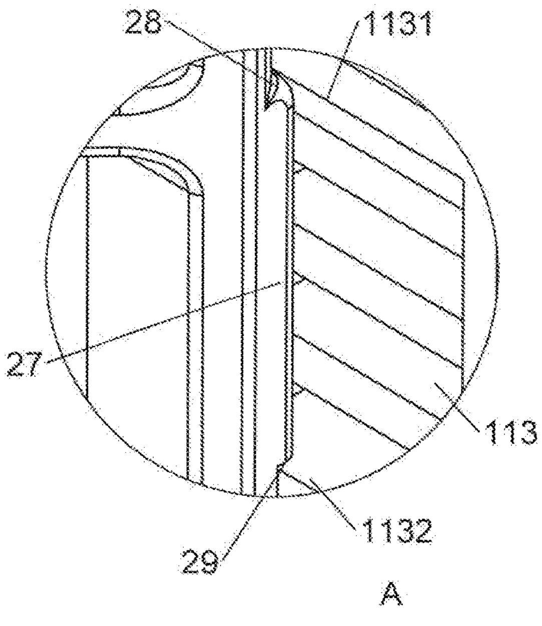
FIG. 9 is a locally enlarged view of the hand tool holder structure taken along circle A as shown in FIG. 8.
Figure 8:
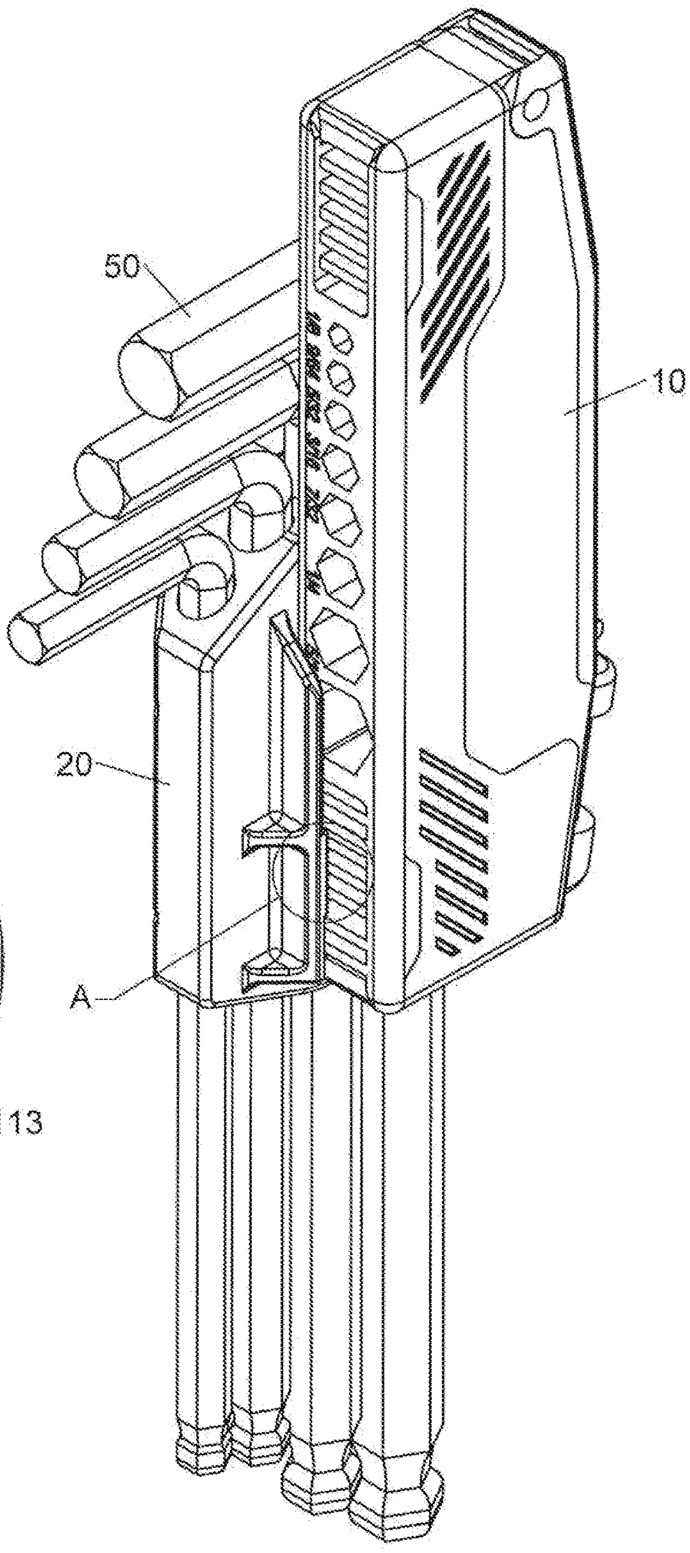
FIG. 8 is a partial perspective view of the hand tool holder structure in accordance with the preferred embodiment of the present invention.
Figure 10:
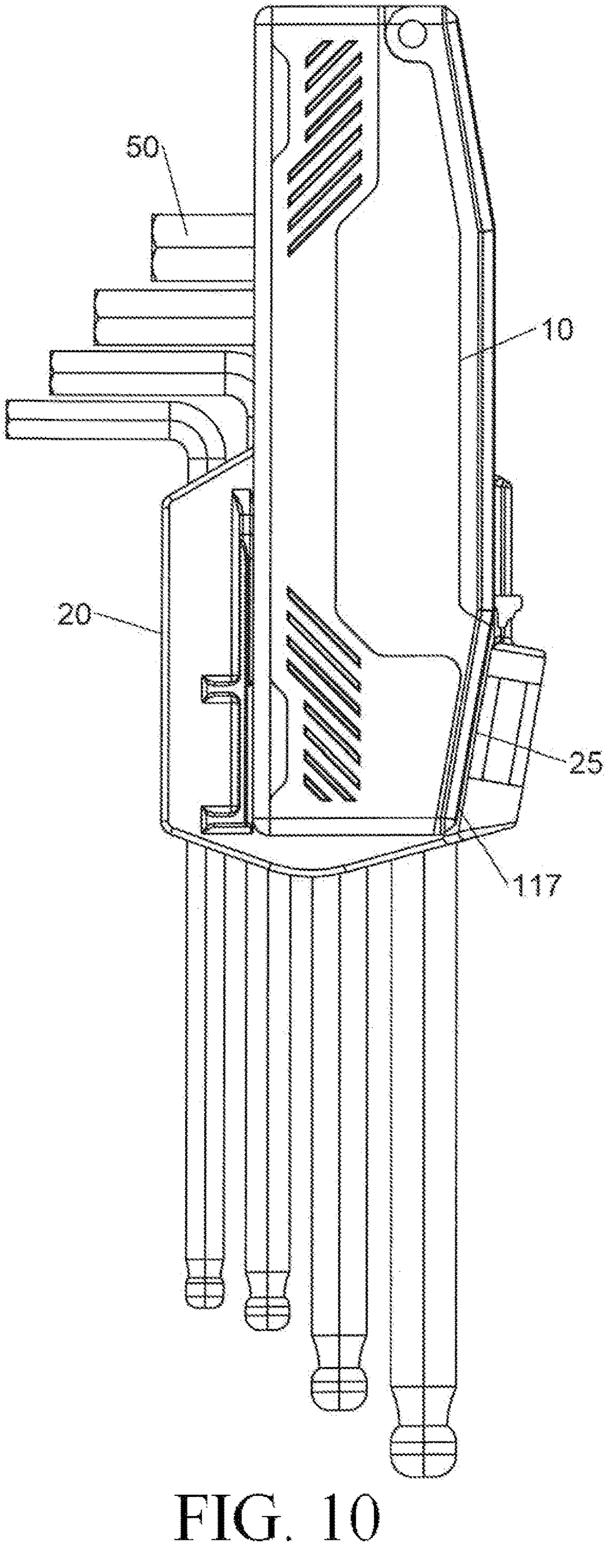
FIG. 10 is a side view of the hand tool holder structure as shown in FIG. 8.

The second body 20 has a second end provided with a first locking block 26. When the second body 20 covers the first body unit 10, the first locking block 26 covers the receiving face 111. The first locking block 26 is elastic. The first locking block 26 is provided with a second limit portion 27 locked in the first limit portion 113 as shown in FIG. 9. The second limit portion 27 is provided with a first locking section 28 locked on the first abutting portion 1131. The second limit portion 27 is provided with a second locking section 29 locked on the second abutting portion 1132.

The third body 30 is pivotally connected with the second body 20. When the third body 30 is parallel with the second body 20, the first body unit 10 is received between the third body 30 and the second body 20. The third body 30 and the second body 20 clamp the first body unit 10.

The third body 30 is snap-fitted (or snapped) on the first body unit 10. The third body 30 has a top provided with multiple third receiving grooves 31. The third receiving grooves 31 have different specifications. The third body 30 has a side provided with a second receiving chamber 32. The second receiving chamber 32 receives the first body unit 10 partially. The second receiving chamber 32 has a top provided with a third opening 321 and a bottom provided with a fourth opening 322. The third opening 321 is larger than the fourth opening 322. The third body 30 has a first end provided with a fourth pivot portion 33 and a second pivot hole 34. The third body 30 is provided with a third inclined face 35 abutting the first inclined face 117. The third inclined face 35 is provided on the fourth pivot portion 33.

The third body 30 has a second end provided with a second locking block 36. When the third body 30 covers the first body unit 10, the second locking block 36 covers the receiving face 111. The second locking block 36 is elastic. The second locking block 36 is provided with a third limit portion 37 locked in the first limit portion 113. The third limit portion 37 is provided with a third locking section 38 locked on the first abutting portion 1131. The third limit portion 37 is provided with a fourth locking section 39 locked on the second abutting portion 1132.

The first limit portion 113 is a groove. Each of the second limit portion 27 and the third limit portion 37 is a projection. Thus, the second limit portion 27 and the third limit portion 37 are retained in the first limit portion 113.

The second inclined face 25 rests on the first inclined face 117, and the third inclined face 35 rests on the first inclined face 117 so that the first body unit 10 can be detached from the first opening 221 and the third opening 321 and cannot be detached from the second opening 222 and the fourth opening 322.

The second pivot member 40 extends through the first pivot hole 24 and the second pivot hole 34 so that the third body 30 is pivotally connected with the second body 20. Thus, the first body unit 10 is clamped between the third body 30 and the second body 20.

The hand tool holder structure further comprises multiple hand tools 50 received in the second receiving grooves 21 or the third receiving grooves 31. The hand tools 50 are removed from the second receiving grooves 21 or the third receiving grooves 31 and are placed into the first receiving grooves 112. Thus, the first body 11 is served as a grip structure for rotating the hand tools 50. Preferably, the hand tools 50 are hex wrenches with different specifications.

In assembly, the second body 20 and the third body 30 cover the first body unit 10. The third pivot portion 23 is pivotally connected with the fourth pivot portion 33. The second limit portion 27 and the third limit portion 37 are received in the first limit portion 113. The first locking section 28 is locked on the first abutting portion 1131, and the second locking section 29 is locked on the second abutting portion 1132. The third locking section 38 is locked on the first abutting portion 1131, and the fourth locking section 39 is locked on the second abutting portion 1132. The second inclined face 25 rests on the first inclined face 117, and the third inclined face 35 rests on the first inclined face 117 so that the second body 20 and the third body 30 clamp the first body unit 10 which will not be detached from the second body 20 and the third body 30. The hand tools 50 are received in the second receiving grooves 21 or the third receiving grooves 31.

Figure 11:
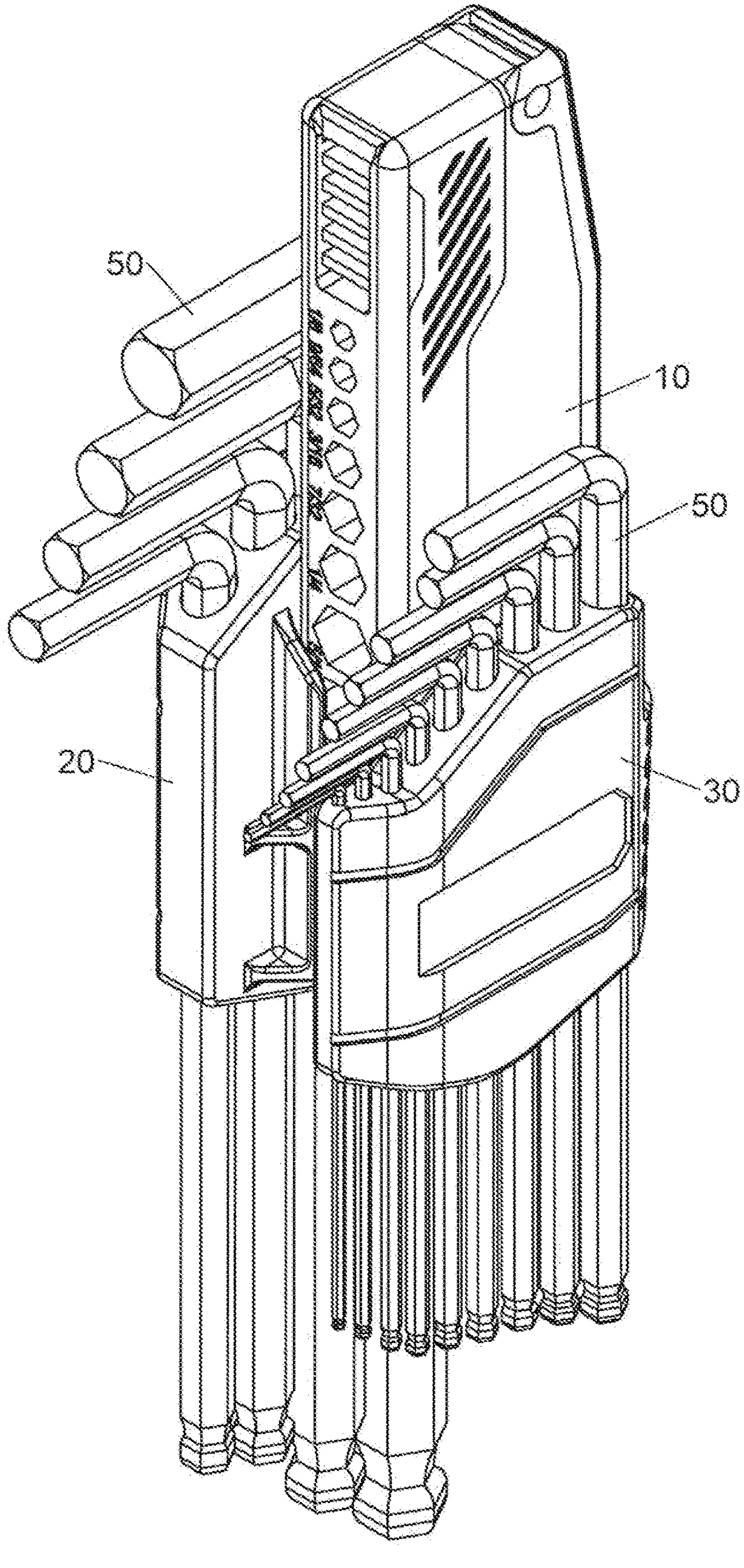
FIG. 11 is a perspective view of the hand tool holder structure in accordance with the preferred embodiment of the present invention.
Figure 12:
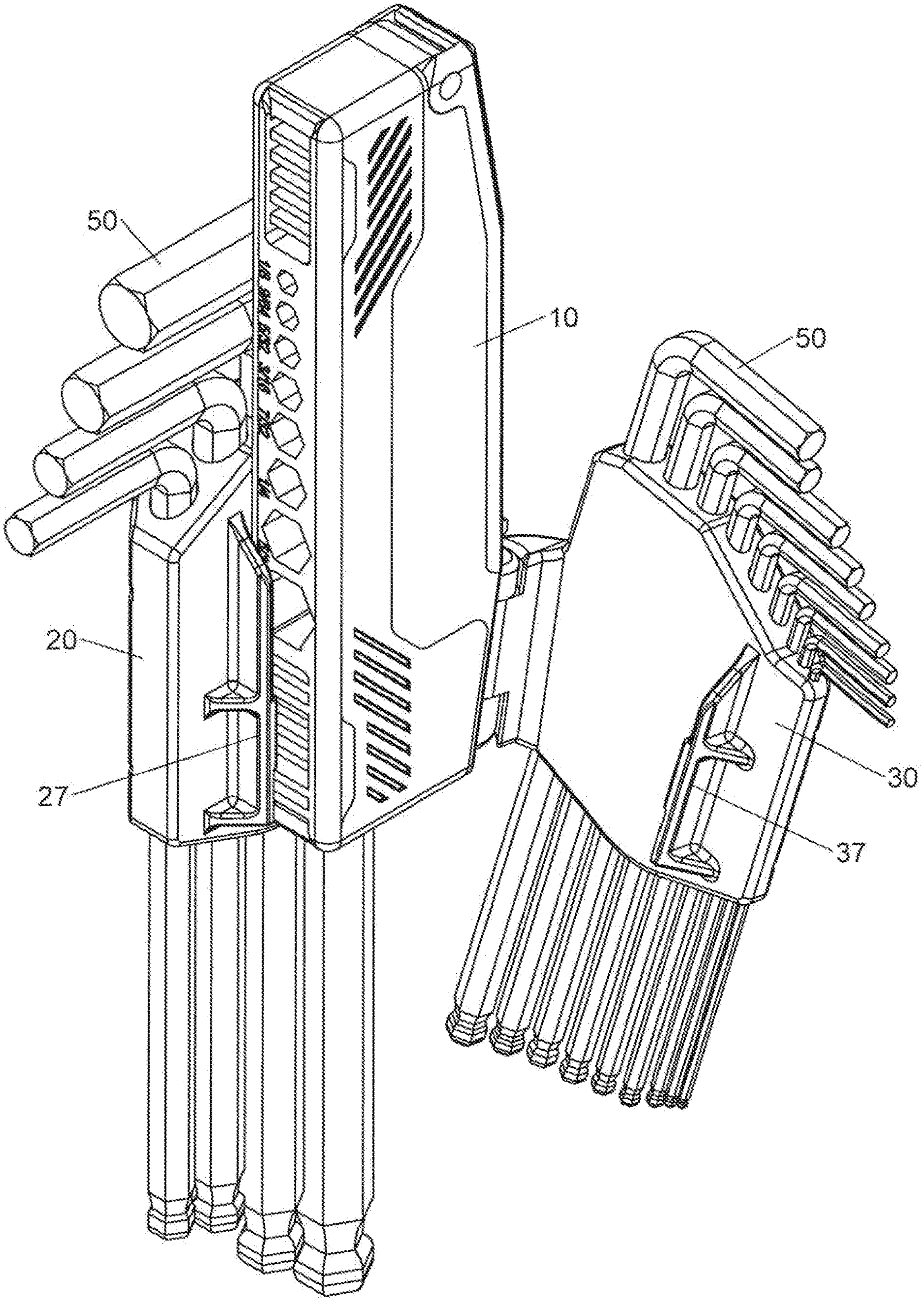
FIG. 12 is a perspective view showing opening of the hand tool holder structure.
Figure 13:
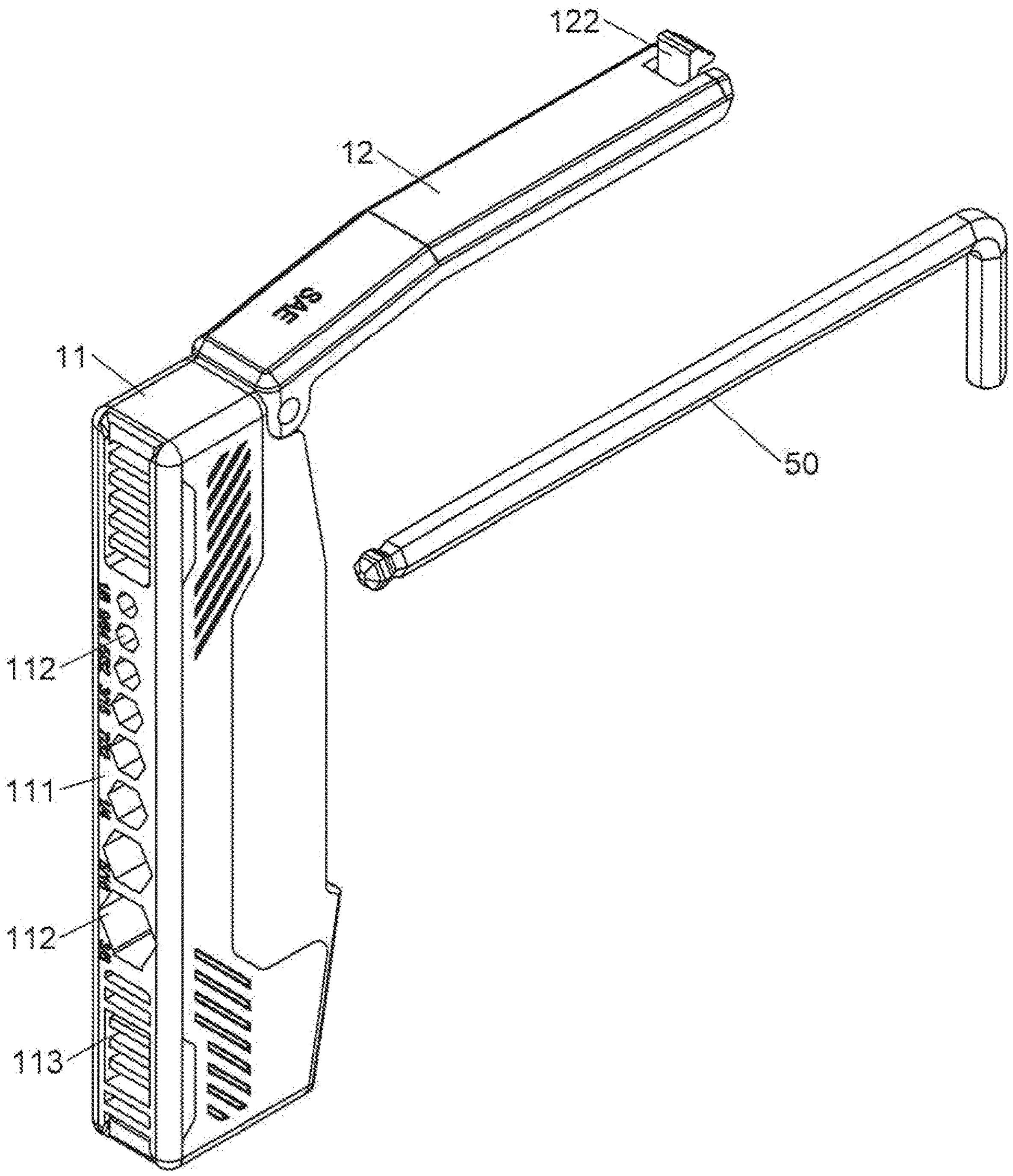
FIG. 13 is a schematic perspective view showing a first operational state of the hand tool holder structure.
Figure 14:
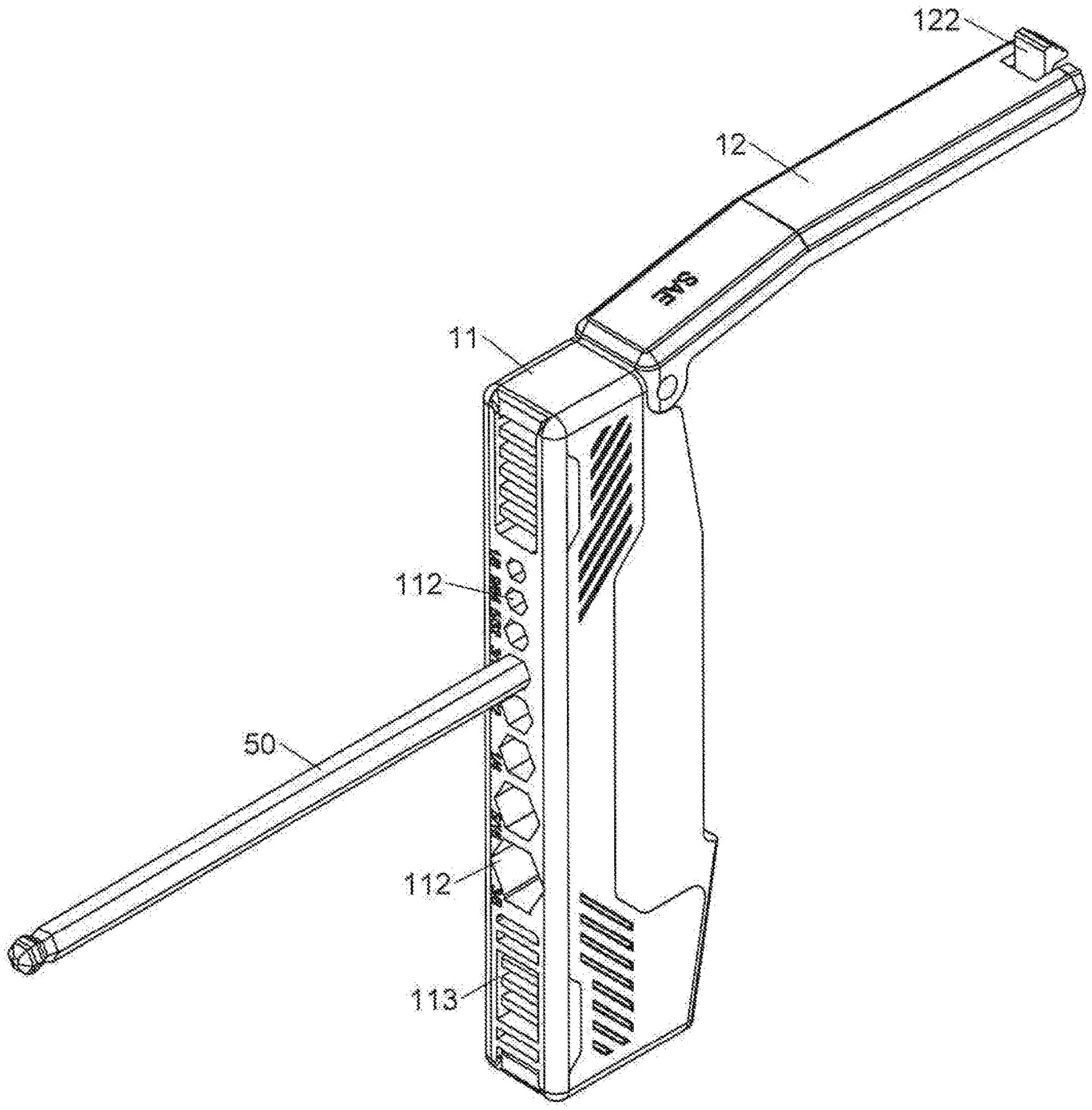
FIG. 14 is a schematic perspective view showing a second operational state of the hand tool holder structure.
Figure 15:
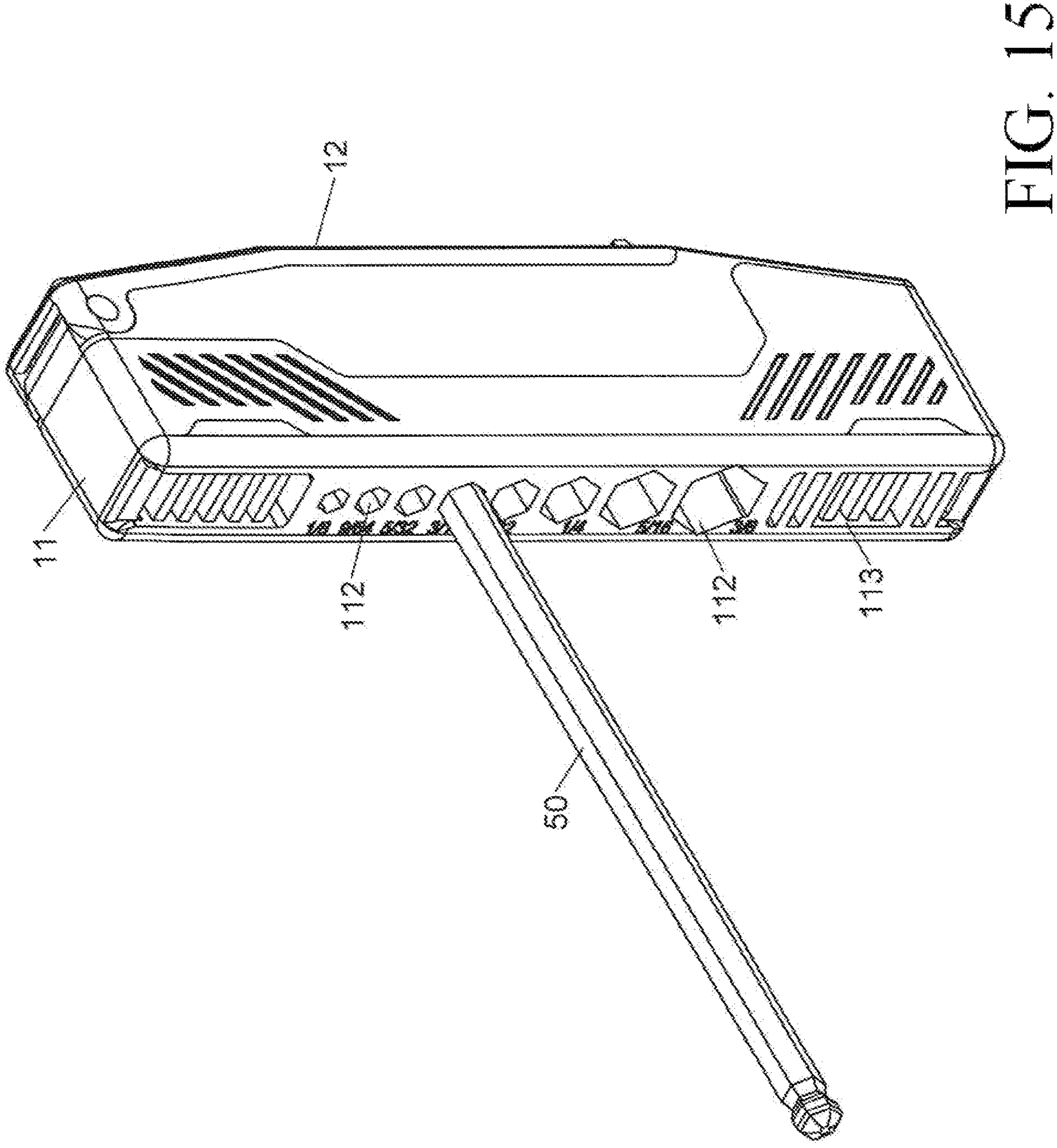
FIG. 15 is a schematic perspective view showing a third operational state of the hand tool holder structure.

In operation, referring to FIGS. 12-15 with reference to FIGS. 1-11, when the first body unit 10 is unlocked from the second body 20 and the third body 30 as shown in FIG. 12, the second body 20 and the third body 30 are removed from the first body unit 10. Then, the cover 12 is pivoted relative to the first body 11 to open the recess 115 as shown in FIG. 13. Then, one of the hand tools 50 is removed from the second receiving grooves 21 or the third receiving grooves 31, extends through the recess 115 and is inserted through one of the first receiving grooves 112 as shown in FIG. 14. Then, the cover 12 is pivoted relative to the first body 11 to close the recess 115 and to cover one of the hand tools 50 as shown in FIG. 15. In such a manner, the first body 11 is served as a grip structure and can be used to rotate one of the hand tools 50 for driving a screw member.

Figure 16:
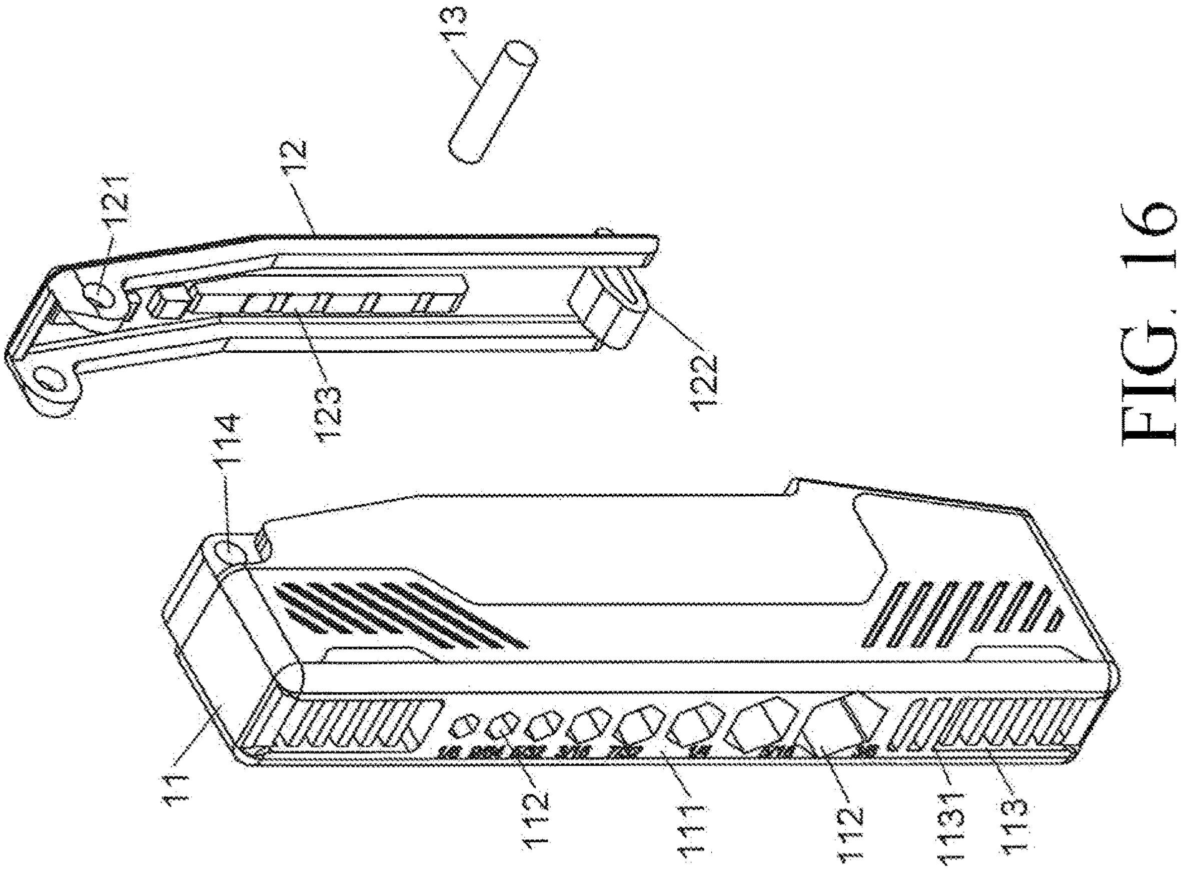
FIG. 16 is an exploded perspective view of a first body unit of the hand tool holder structure in accordance with the second preferred embodiment of the present invention.
Figure 17:
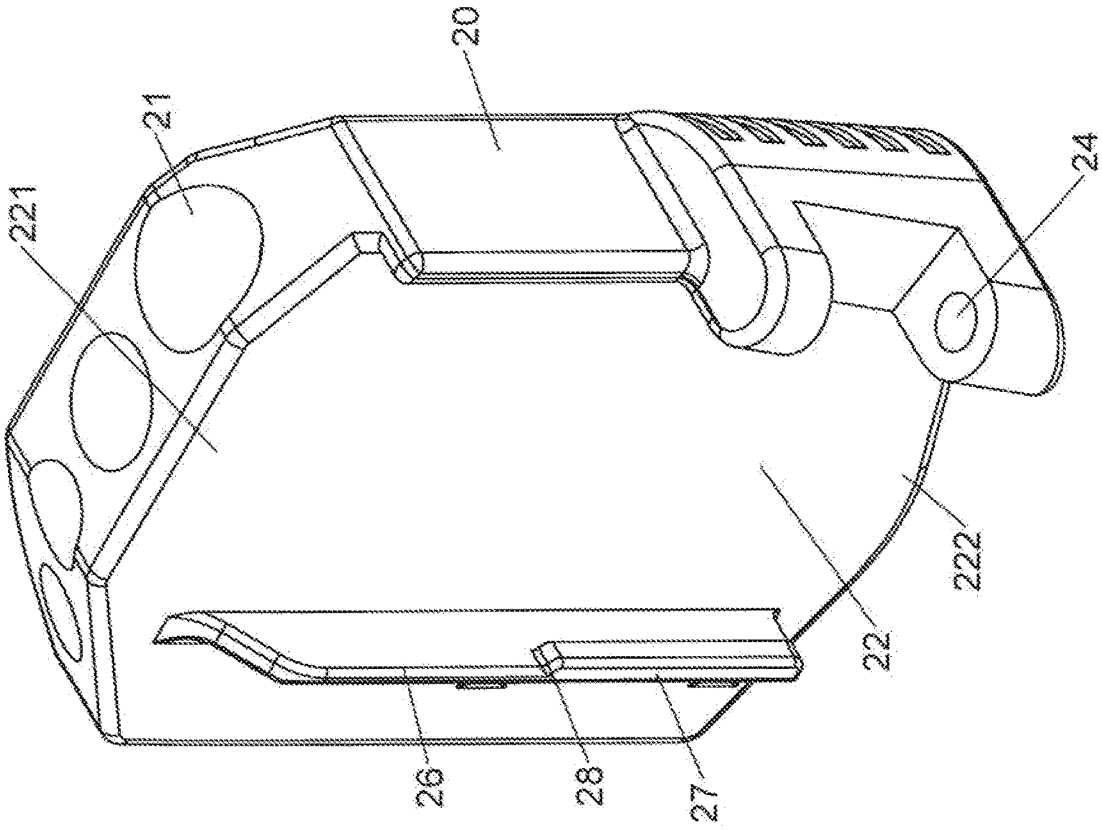
FIG. 17 is a perspective view of a second body of the hand tool holder structure in accordance with the second preferred embodiment of the present invention.

Referring to FIGS. 16 and 17 with reference to FIGS. 1-11, the second abutting portion 1132 of the first limit portion 113 is undefined, the second locking section 29 of the second limit portion 27 is undefined, the first locking section 28 is locked on the first abutting portion 1131, the fourth locking section 39 of the third limit portion 37 is undefined, and the third locking section 38 is locked on the first abutting portion 1131.

Figure 19:
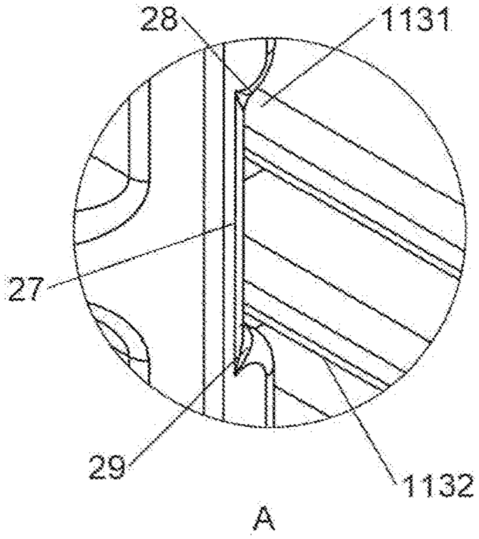
FIG. 19 is a locally enlarged view of the hand tool holder structure taken along circle A as shown in FIG. 18.
Figure 18:
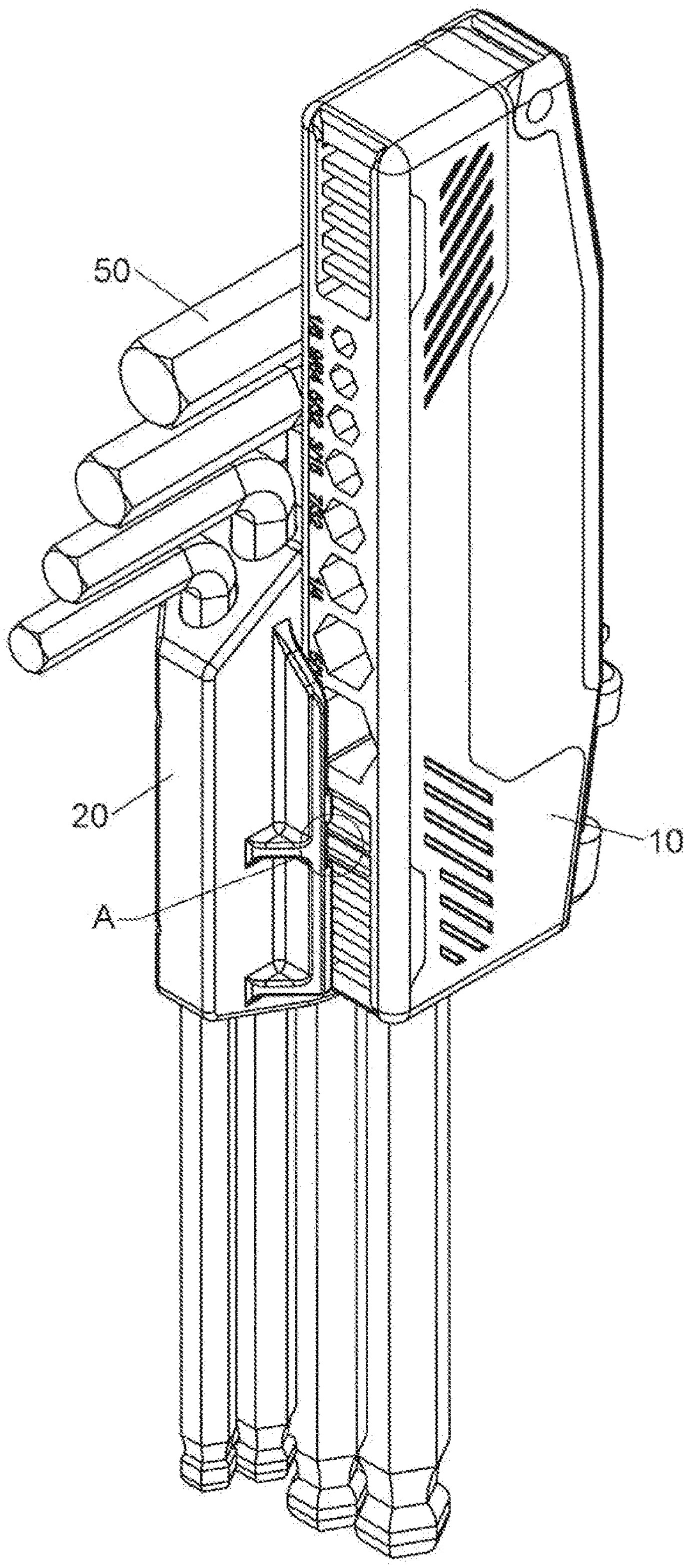
FIG. 18 is a partial perspective view of a hand tool holder structure in accordance with the third preferred embodiment of the present invention.

Referring to FIGS. 18 and 19 with reference to FIGS. 1-11, the first limit portion 113 is a projection, each of the first abutting portion 1131 and the second abutting portion 1132 is a protruding edge, each of the second limit portion 27 and the third limit portion 37 is a groove, each of the first locking section 28 and the second locking section 29 is a recessed edge, and each of the third locking section 38 and the fourth locking section 39 is a recessed edge.

Accordingly, the hand tool holder structure has the following advantages.

1. As shown in FIG. 11, the third body 30 is pivotally connected with the second body 20. When the third body 30 is parallel with the second body 20, the first body unit 10 is received between the third body 30 and the second body 20 so that the third body 30 and the second body 20 clamp the first body unit 10. Thus, the first body unit 10, the second body 20, and the third body 30 overlap each other, so that the first body unit 10, the second body 20, and the third body 30 are assembled to construct the hand tool holder structure which has a smaller volume.

2. The third pivot portion 23 is pivotally connected with the fourth pivot portion 33 by the second pivot member 40 so that the third body 30 is pivotally connected with the second body 20. The second limit portion 27 and the third limit portion 37 are locked on the first limit portion 113. Thus, the second body 20 and the third body 30 are mounted on the first body unit 10 steadily and solidly.

3. The first body unit 10 is assembled with the second body 20, the first body unit 10 is assembled with the third body 30, the second body 20 is assembled with the third body 30, and the first body unit 10, the second body 20, and the third body 30 are assembled together. Thus, the first body unit 10, the second body 20, and the third body 30 are combined exactly.

4. The second inclined face 25 rests on the first inclined face 117, and the third inclined face 35 rests on the first inclined face 117 so that the first body unit 10 can be released from the first opening 221 and the third opening 321 and cannot be released from the second opening 222 and the fourth opening 322.

5. After the second body 20 and the third body 30 are removed from the first body unit 10, the hand tools 50 are received in and rests on the recess 115 and the first receiving grooves 112. Thus, the hand tools 50 are mounted on the first body unit 10, and the first body 11 is served as a grip structure which is held by the user and can be used to operate the hand tools 50.

6. The first locking section 28 is locked on the first abutting portion 1131, the second locking section 29 is locked on the second abutting portion 1132, the third locking section 38 is locked on the first abutting portion 1131, the fourth locking section 39 is locked on the second abutting portion 1132, and the first limit portion 113 is limited by the second limit portion 27 and the third limit portion 37, so that the first body unit 10 cannot be detached from the second body 20 and the third body 30 easily.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A hand tool holder structure comprising:

a first body unit including a first body, a cover, and a first pivot member;

wherein:

the first body has a first side provided with a receiving face;

the receiving face is provided with multiple first receiving grooves;

the receiving face is provided with a first limit portion;

the first limit portion has an upper end provided with a first abutting portion and a lower end provided with a second abutting portion;

the first body has an end provided with a first pivot portion;

the first pivot portion is a transverse circular hole;

the first body has a second side provided with a recess;

the recess is connected to the first receiving grooves;

the recess is provided with multiple first resting blocks;

the recess is provided with a snap-fit portion;

the snap-fit portion and the first pivot portion are located at two opposite ends of the recess;

the first body has a bottom provided with a first inclined face;

the bottom of the first body has a width gradually decreasing along the first inclined face;

the first inclined face is close to the snap-fit portion;

the first inclined face and the first limit portion are located at two opposite sides of the first body;

the cover is pivotally connected with the first body;

the cover covers the recess;

the cover has a first end provided with a second pivot portion pivotally connected with the first pivot portion;

the cover is rotated relative to the first body to open or close the recess;

the cover has a second end provided with a snap-fit piece locked on the snap-fit portion;

the snap-fit piece is elastic;

the first pivot member extends through the first pivot portion and the second pivot portion so that the cover is pivotally connected with the first body to open or close the recess;

the hand tool holder structure further comprises a second body, a third body, and a second pivot member;

the second body is snap-fitted on the first body unit;
the second body has a top provided with multiple second receiving grooves;
the second receiving grooves have different specifications;
the second body has a side provided with a first receiving chamber;
the first receiving chamber receives the first body unit partially;
the first receiving chamber has a top provided with a first opening and a bottom provided with a second opening;
the first opening is larger than the second opening;
the second body has a first end provided with a third pivot portion and a first pivot hole;
the second body is provided with a second inclined face which abuts the first inclined face when the hand tool holder structure is in a closed configuration;
the second body has a second end provided with a first locking block;
when the second body covers the first body unit, the first locking block covers the receiving face;
the first locking block is elastic;
the first locking block is provided with a second limit portion locked in the first limit portion when the hand tool holder structure is in a closed configuration;
the second limit portion is provided with a first locking section lockable to the first abutting portion;
the second limit portion is provided with a second locking section lockable to the second abutting portion;
the third body is pivotally connected with the second body;
when the third body is parallel with the second body, the first body unit is received between the third body and the second body;
the third body and the second body clamp the first body unit when the hand tool holder structure is in a closed configuration;
the third body may be snap-fitted on the first body unit;
the third body has a top provided with multiple third receiving grooves;
the third receiving grooves have different specifications;
the third body has a side provided with a second receiving chamber;
the second receiving chamber receives the first body unit partially;
the second receiving chamber has a top provided with a third opening and a bottom provided with a fourth opening;
the third opening is larger than the fourth opening;
the third body has a first end provided with a fourth pivot portion and a second pivot hole;
the third body is provided with a third inclined face abutting the first inclined face;
the third body has a second end provided with a second locking block;
when the third body covers the first body unit, the second locking block covers the receiving face;
the second locking block is elastic;
the second locking block is provided with a third limit portion locked in the first limit portion when the hand tool holder structure is in a closed configuration;
the third limit portion is provided with a third locking section locked on the first abutting portion;
the third limit portion is provided with a fourth locking section locked on the second abutting portion;
the second inclined face may rest on the first inclined face, and the third inclined face may rest on the first inclined face so that the first body unit can be slid through the first opening and the third opening and cannot be slidably detached from the second opening and the fourth opening;
the second pivot member extends through the first pivot hole and the second pivot hole so that the third body is pivotally connected with the second body; and
the first body unit is clamped between the third body and the second body when the hand tool holder structure is in a closed configuration.

2. The hand tool holder structure as claimed in claim 1, wherein:
the first body is an elongate block;
the receiving face has a planar shape;
each of the first receiving grooves has a hexagonal or noncircular shape;
the first receiving grooves are arranged linearly;
the first receiving grooves have different specifications;
the receiving face is provided with multiple or characters indicating different sizes of the first receiving grooves;
the first receiving grooves are arranged at a central position of the receiving face;
the first limit portion is a depression; and
the first limit portion situated at a side of the first receiving grooves.

3. The hand tool holder structure as claimed in claim 1, wherein:
the recess has an elongate shape;
the first resting blocks are arranged linearly; and
the first resting blocks are parallel with the first receiving grooves.

4. The hand tool holder structure as claimed in claim 1, wherein the cover has a side provided with a second resting block aligning with the first resting blocks.

5. The hand tool holder structure as claimed in claim 1, wherein the second inclined face is provided on the third pivot portion.

6. The hand tool holder structure as claimed in claim 1, wherein the third inclined face is provided on the fourth pivot portion.

7. The hand tool holder structure as claimed in claim 1, wherein:
the first limit portion is a groove;
each of the second limit portion and the third limit portion is a projection; and
the second limit portion and the third limit portion are retained in the first limit portion.

8. The hand tool holder structure as claimed in claim 1, further comprising:
multiple hand tools received in the second receiving grooves or the third receiving grooves;
wherein:
the hand tools are removed from the second receiving grooves or the third receiving grooves and are placed into the first receiving grooves;
the first body is served as a grip structure for rotating the hand tools; and
the hand tools are hex wrenches with different specifications.

9. The hand tool holder structure as claimed in claim 1, wherein:
the first limit portion is a projection, each of the first abutting portion and the second abutting portion is a protruding edge;
each of the second limit portion and the third limit portion is a groove;

each of the first locking section and the second locking section is a recessed edge; and each of the third locking section and the fourth locking section is a recessed edge.

* * * * *